US009540059B2

(12) United States Patent
Shirk, Jr.

(10) Patent No.: US 9,540,059 B2
(45) Date of Patent: Jan. 10, 2017

(54) FIFTH WHEEL TRAILER SAFETY DEVICE

(75) Inventor: Paul W. Shirk, Jr., Goshen, IN (US)

(73) Assignee: INTEGRITY INNOVATIONS GROUP, LLC, Goshen, IN (US)

(*) Notice: Subject to any disclaimer, the term of this patent is extended or adjusted under 35 U.S.C. 154(b) by 147 days.

(21) Appl. No.: 14/375,386

(22) PCT Filed: Jun. 12, 2012

(86) PCT No.: PCT/US2012/042036
§ 371 (c)(1),
(2), (4) Date: Jul. 29, 2014

(87) PCT Pub. No.: WO2013/115839
PCT Pub. Date: Aug. 8, 2013

(65) Prior Publication Data
US 2015/0008656 A1    Jan. 8, 2015

Related U.S. Application Data

(60) Provisional application No. 61/592,331, filed on Jan. 30, 2012.

(51) Int. Cl.
*B62D 53/08* (2006.01)
*B62D 53/10* (2006.01)
*B60D 1/28* (2006.01)
*B60D 1/01* (2006.01)

(52) U.S. Cl.
CPC .............. *B62D 53/10* (2013.01); *B60D 1/015* (2013.01); *B60D 1/28* (2013.01); *B62D 53/08* (2013.01); *B62D 53/0857* (2013.01)

(58) Field of Classification Search
CPC ......... B62D 53/08; B62D 53/10; B62D 53/06; B62D 53/0842; B62D 53/0878; B62D 53/085; B60D 1/015; B60D 1/28; B60D 1/58
USPC .......................... 280/433, 434, 457, 477, 507
See application file for complete search history.

(56) References Cited

U.S. PATENT DOCUMENTS

| 2,282,414 | A | * | 5/1942 | Black | B62D 53/08 188/3 H |
| 4,251,089 | A | * | 2/1981 | Skaggs | B62D 53/08 280/433 |
| 6,491,317 | B1 | * | 12/2002 | Breese | B62D 53/0828 280/432 |
| 6,547,270 | B1 | * | 4/2003 | Breese | B62D 53/10 280/432 |
| 9,010,794 | B2 | * | 4/2015 | Shirk, Jr. | B62D 53/10 280/432 |
| 2003/0042706 | A1 | * | 3/2003 | Breese | B62D 53/0828 280/432 |
| 2007/0108728 | A1 | * | 5/2007 | Germann | B62D 53/08 280/433 |

* cited by examiner

*Primary Examiner* — Anne Marie Boehler
(74) *Attorney, Agent, or Firm* — Botkin & Hall, LLP

(57) ABSTRACT

A safety device for use with a fifth wheel trailer hitch. The safety device is mounted to a first and second rail, these rails secure both the fifth wheel hitch and the safety device to the frame of a vehicle. The safety device is generally U-shaped and extends rearwardly of the fifth wheel hitch to a catch. The catch is defined as the base of the "U" and serves to catch the king pin of a trailer in case the king pin is loosed from the fifth wheel hitch.

7 Claims, 4 Drawing Sheets

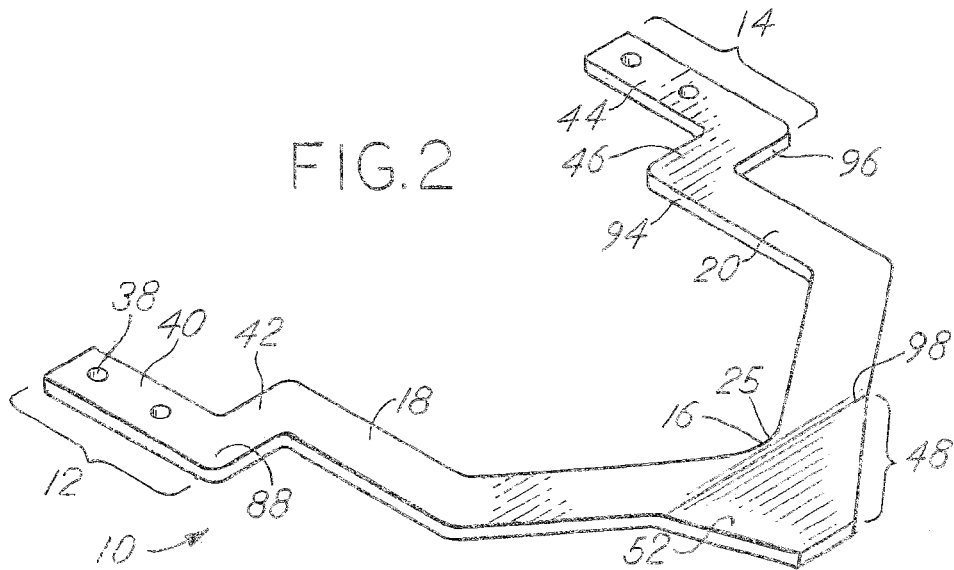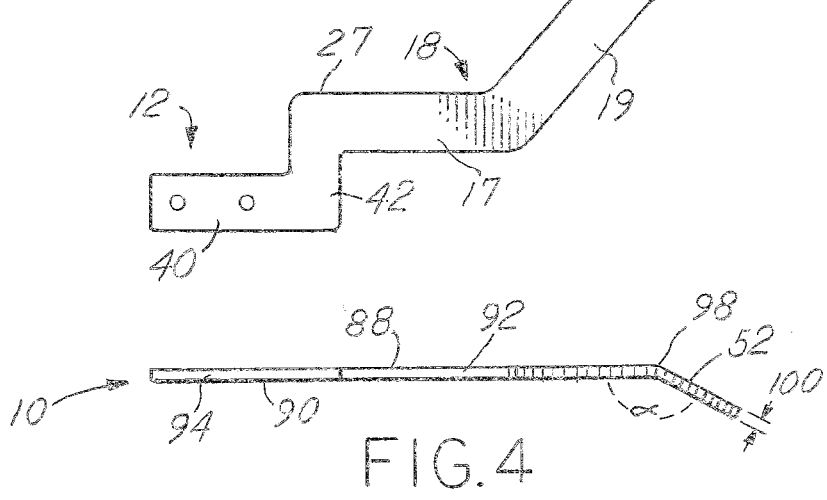

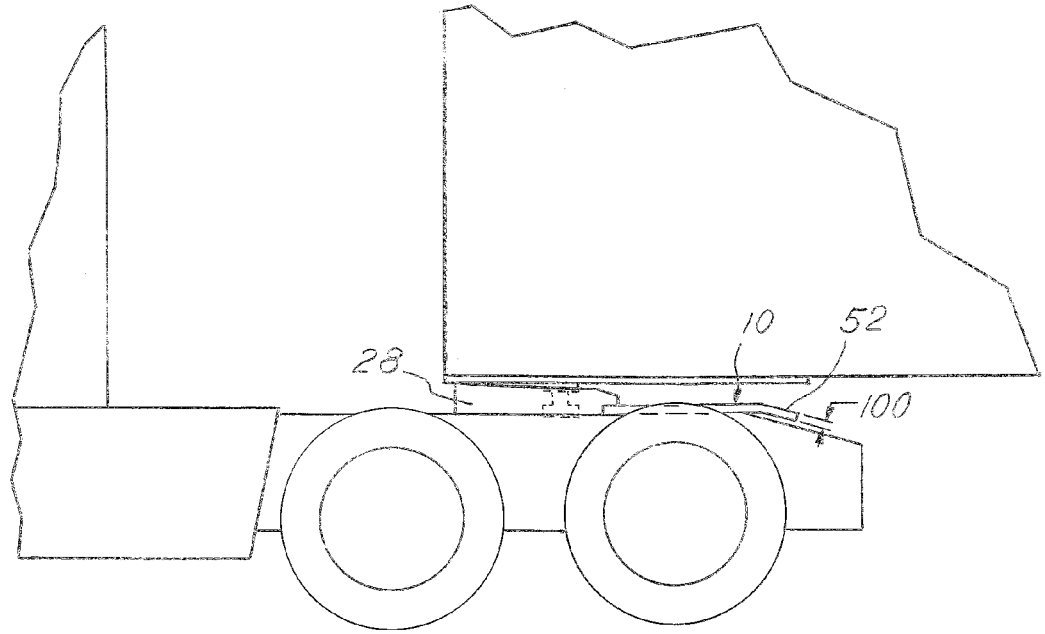
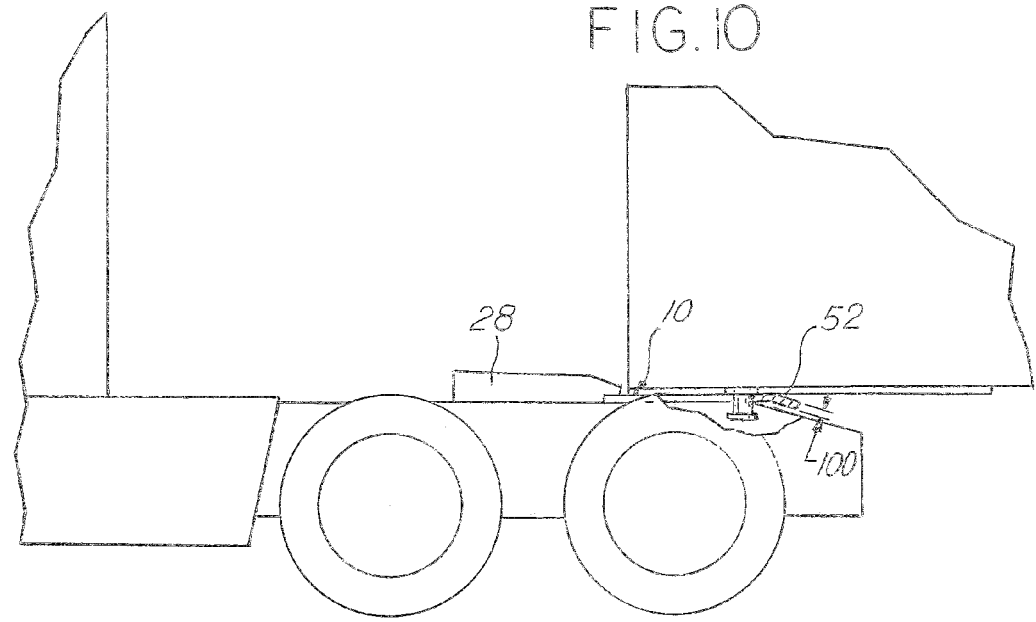

FIFTH WHEEL TRAILER SAFETY DEVICE

CROSS REFERENCE TO RELATED APPLICATIONS

This application claims the benefit of PCT Application No.: PCT/US2012/42036 filed on Jun. 12, 2012 which claims priority to U.S. Provisional Application No. 61/592,331, filed Jan. 30, 2012, the disclosures and entire contents of which are incorporated herein by reference.

BACKGROUND OF THE INVENTION

Towable trailers are frequently coupled to a vehicle by a fifth-wheel trailer hitch. Such hitches have been used for decades. In the typical case, a fifth-wheel hitch is mounted on a pair of parallel rails, with the rails in turn mounted to the frame of the vehicle. The fifth-wheel hitch is typically located above, or forward of, the vehicle's rear-most axle. A trailer used with a fifth-wheel hitch includes a kingpin downwardly extending from the front portion of the trailer. The kingpin is coupled to the fifth-wheel hitch at a keyhole slot in the hitch by an articulating jaw. The jaw extends around the kingpin so as to prevent movement of the kingpin out of the keyhole slot. The articulating jaw is composed of mechanical parts which allow it to move between a locked and an unlocked position to allow the trailer to be coupled and uncoupled from the towing vehicle. As with any mechanical parts, the articulating jaw is subject to mechanical failure. A typical vehicle has no safety mechanism which holds the trailer to the towing vehicle in the case of an articulating jaw failure. When a vehicle and trailer are traveling, failure of the articulating jaw generally results in the trailer coming loose from the vehicle, and can result in significant injury to person and property.

SUMMARY OF THE INVENTION

The present invention relates to a safety device which serves as a safety mechanism to hold a trailer to a vehicle in the case of a fifth-wheel hitch failure. The safety device is U-shaped and includes a pair of mounting arms for securing the safety device to a vehicle. The safety device spans between, and extends rearwardly from, the mounting arms and the base of the "U" serves as a catch where the kingpin will be retained in the event the kingpin is loosed from the articulating jaw of the fifth-wheel hitch while the vehicle is in motion.

BRIEF DESCRIPTION OF THE DRAWINGS

A preferred embodiment of this invention has been chosen wherein:

FIG. 1A is a side cutaway view of a trailer and king pin;
FIG. 2 is a close-up perspective view of the safety device of FIG. 1;
FIG. 3 is a top view of the safety device of FIG. 2;
FIG. 4 is a side view of the safety device of FIG. 2;
FIG. 9 is a side view of the invention as it is installed on a tractor trailer;
and
FIG. 10 is a side view as shown in FIG. 9, with the trailer being retained by the safety device of the present invention.

DESCRIPTION OF THE PREFERRED EMBODIMENT

Figure 1:
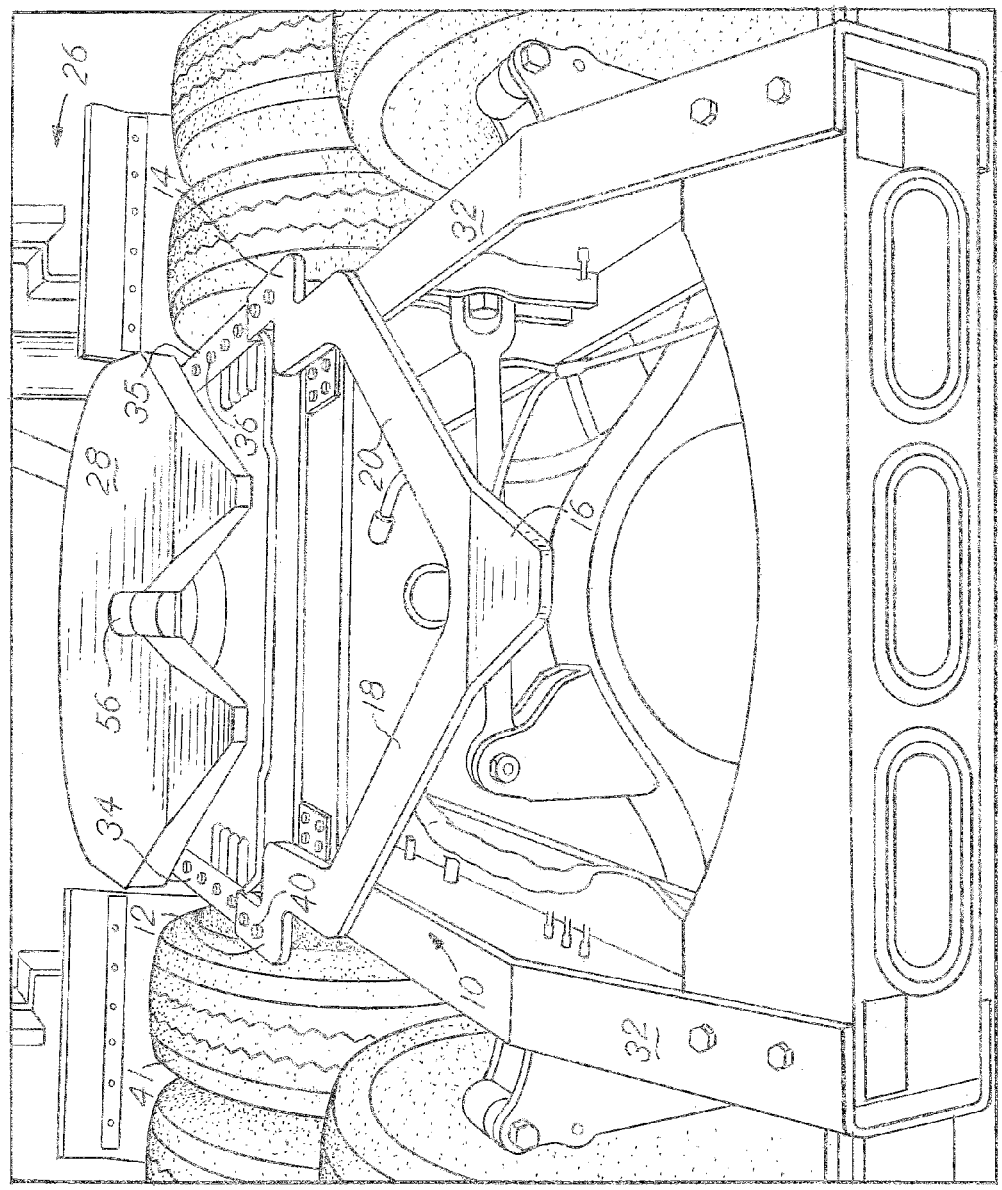
FIG. 1 is a perspective view of a vehicle carrying a fifth wheel hitch and a safety device.
Figure 5:
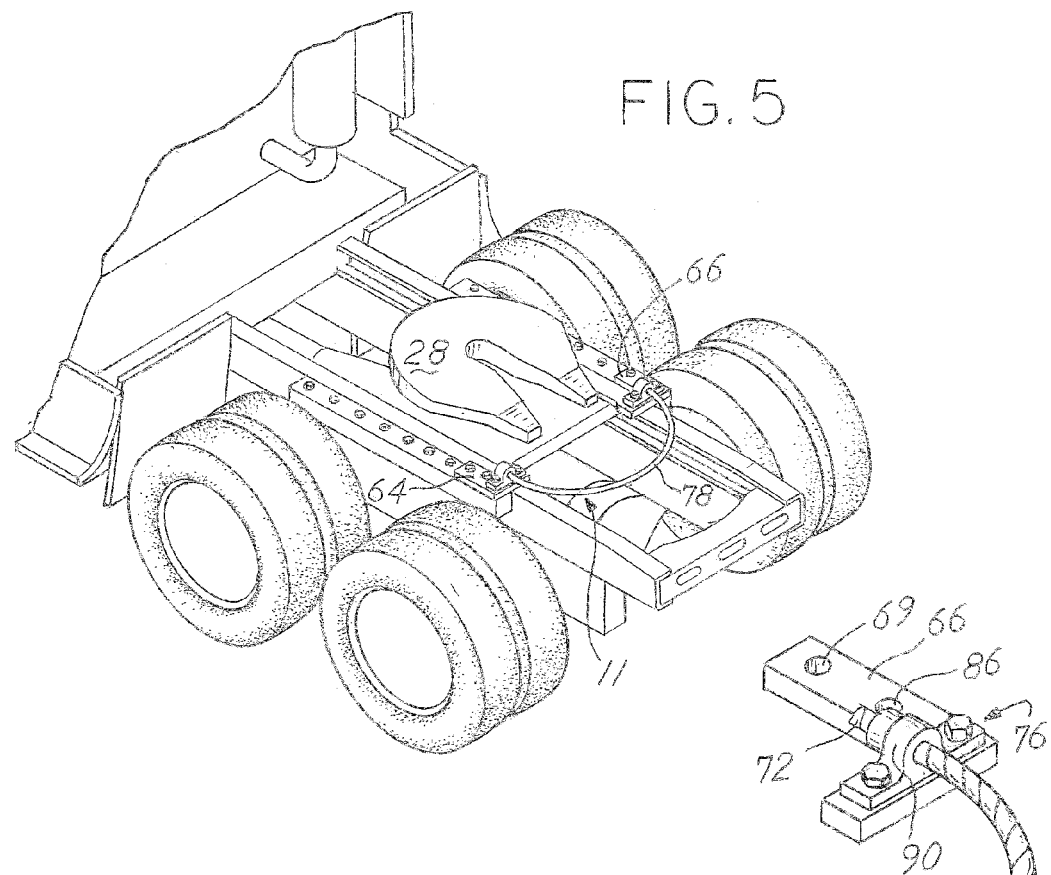
FIG. 5 is a perspective view of a vehicle carrying fifth wheel hitch and a safety device.

Referring to FIGS. 1-4, a safety device 10 is defined by a first mounting arm 12, a second mounting arm 14, and a catch 16 spaced therebetween. Mounting arms 12, 14 are for mounting safety device 10 to a vehicle 26. A first bridging member 18 joins catch 16 to first mounting arm 12 and a second bridging member 20 joins catch 16 to second mounting arm 14. The first bridging member 18 has a offsetting portion 17 and a funneling portion 19. The second bridging member 20 has a offsetting portion 21 and a funneling portion 23. Together, first bridging member 18, catch 16 and second bridging member 20 are U-shaped. The mounting arms 12, 14, bridging members 18, 20 and catch 16 are formed as a unitary object. The offsetting portions 17, 21 locate the funneling portions 19, 23 more rearwardly of the mounting arms 12, 14 then would be the case if the funneling portions 19, 23 were directly connected to the mounting arms 12, 14.

As described herein vehicle 26 has a forward end, which is in the direction of a front bumper of the vehicle, and a rearward end which is in the direction of a trailer 43 (not shown) which is towed behind the vehicle. As such, any reference herein to forward or rearward is relative to the forward or rearward ends of vehicle 26. In the typical configuration, fifth wheel trailer hitch 28 is mounted above the rear axle(s) of vehicle 26. Hitch 28 is secured to the frame 32 of the vehicle. In the typical configuration a pair of parallel rails 34, 35 are secured to the frame 32 of vehicle 26, with the hitch 28 mounted on the rails. Rails 34, 35 each include a series of spaced apertures 36 along the length of the rails which allow hitch 28 to be mounted to rails 34, 35 which in turn are mounted to frame 32. The safety device is mounted to a vehicle 26 that is a truck, semi or similar vehicle which includes a fifth wheel trailer hitch 28.

Mounting arms 12, 14 each include one or more apertures 38 through which fasteners 41 couple first mounting arm 12 to rail 34 and second mounting arm 14 to rail 35. The mounting arms 12, 14 are mounted to rails 34, 35 at a rearward position from hitch 28. The mounting arms 12, 14 overlie hitch 28 such that safety device 10 and hitch 28 are secured, at least in part, to frame 32 with common fasteners 41.

The safety device 10 is formed having mounting arms 12, 14, bridging members 18, 20 and catch 16 formed as a unitary object, as shown in FIGS. 2-4. The mounting arms 12, 14 are secured at apertures 38 to rails 34, 35. Mounting arm 12 is L-shaped, with a first leg 40 of the L overlying, and parallel with rail 34 and having apertures 38 through which first leg 40 is mounted to rail 34. The second leg 42 of mounting arm 12 is oriented perpendicularly to first leg 40 and extends inwardly toward the centerline of vehicle 26. First bridging member 18 extends rearwardly from second leg 42 of mounting arm 12. The offsetting portion 17 is connected to second leg 42 and extends rearwardly into funneling portion 19. Second mounting arm 14 is L-shaped with a first leg 44 and a second leg 46 oriented perpendicularly to one another. First leg 44 of second mounting arm 14 overlies and is parallel with rail 35 with second leg 46 extending inwardly toward second leg 42 of first mounting arm 12. The offsetting portion 21 is connected to second leg 46 and extends rearwartly into funneling portion 23. Catch 16 is spaced rearwardly from the mounting arms 12,14, and roughly equidistant between rails 34, 35. Catch 16 extends between funneling portions 19, 23 and has an inside edge 25 forming a "U" portion of the trough. Second mounting arm 14 is a mirror-image of first mounting arm 12. Both of the funneling portions 19, 23 are connected to their respective offsetting members 17, 21 at obtuse angles. Thereby, safety device 10 includes two L-shaped mounting arms 12, 14, with a U-shaped section formed from bridging members 18, 20 and catch 16 extending rearwardly from the mounting arms 12, 14. When installed, the second legs 42, 46 of the mounting arms 12, 14 locate the offsetting portions 17, 21 so that their inner edges 27, 29 are inside of frame rails 34,35 on the vehicle 26.

Safety Device 10 is formed having a top surface 88 and a bottom surface 90, which are separated by an edge 92 which circumscribes the entire safety device 10. Edge 92 includes an inner edge portion 94 that extends from first leg 42 to second leg 46. Safety device 10 includes a nose 48, defined by outer edge 96 and a line 98, parallel with arms 42, 46. Nose 48 is angled downwardly relative to the balance of the safety device with line 98 defining a crease about which safety device 10 is angled. The portion of top surface 88 on nose 48 defines a ramped surface 52 to safety device 10. Ramped surface 52 is preferably angled at an obtuse angle α, as seen in FIG. 4, relative to the balance of safety device 10.

One application of safety device 10 is for use with a fifth wheel hitch 28. Fifth wheel hitches generally are used to connect a trailer 43 to a vehicle 26. In the typical configuration, trailer 43 will have a down-turned kingpin 54 extending from a forward portion of trailer 43. Generally, kingpin 54 extends downwardly from a hitch plate 110 which is a metal plate mounted to the underside of the front portion of trailer 43, and is for providing support, structure, and stability to the kingpin and the trailer. Fifth wheel hitch 28 includes a kingpin slot 56 for accepting kingpin 54 and a locking jaw within slot 56 which is adapted for gripping and retaining kingpin 54 in kingpin slot 56. Locking jaw is articulable between a locked and an unlocked position. The locking jaw is well known in the art and may come in various forms such as a single jaw or a double jaw. All serving the same purpose of locking the kingpin 54 in a pivotal connection with the hitch 28.

Catch 16 faces the kingpin slot 56 such that if the jaw fails, and as a result kingpin 54 is ejected from fifth wheel hitch 28, the kingpin will move rearwardly toward safety device 10 and contact catch 16. Due to the geometry of hitch 28, and the weight of trailer 43, the typical direction of ejection of kingpin 54 from hitch 28 is in the direction of safety device 10. Additionally, the most likely time for the jaw to fail is when the truck is accelerating forward, as the bulk of the weight of the load in trailer 43 will be pushing rearwardly against the jaw in response to the forward acceleration. During such forward acceleration, if the jaw fails, trailer 43 will begin to decelerate relative vehicle 26, which will cause kingpin 54 to move rearwardly relative hitch 28. Such rearward movement of kingpin 54 will move the kingpin into the safety device 10. The offsetting portion 17, 21 are chosen to be a length that will allow time for the kingpin 54 to fall into the safety device 10. As the kingpin 54 moves rearward, the funneling portions 19, 23 will funnel the kingpin 54 into the centrally located catch 16. Catch 16 will retain trailer 43 in contact with vehicle 26 so that trailer 43 does not come loose from the vehicle, and will provide the operator the opportunity to safely stop the vehicle and attend to repairing hitch 28. Due to the central location of the catch 16, the vehicle 26 will be able to tow the trailer 43 in a similar fashion as would be done with the kingpin 54 properly located in the hitch 28. Safety device 10 and catch 16 are a significant improvement over the prior art. The standard vehicle 26 which pulls a trailer 43 using a fifth wheel hitch 28 does not include any safety mechanism to retain the trailer in contact with the vehicle in the event the kingpin is loosed from the articulating jaw of the fifth-wheel hitch while the vehicle is in motion.

Ramped surface 52 functions to protect the leading surface of safety device 10 from blunt trauma from hitting kingpin 54 when trailer 43 is being coupled to fifth wheel hitch 28. By having an angled leading surface, kingpin 54 will be pushed up and over ramped surface 52 when trailer 43 is being coupled to vehicle 26. Ramped surface 52 protects both kingpin 54 and safety device 10 from damage during the coupling of trailer 26 to fifth wheel hitch 28.

Safety device 10 has a thickness 100 defined as the distance between the top side 88 and bottom side 90, as shown in FIG. 4. Kingpin 54 is well known in the art, and is typically formed as a rod axially extending from the underside of trailer 43, with the kingpin 54 having a narrowed section 102 defined by a wider lower section 104 and upper section 106, where narrowed section 102 has a smaller diameter than both lower section 104 and upper section 106. Narrowed section 102 has a height 108 defined as the distance between lower section 104 and upper section 106. In the preferred embodiment, thickness 100 of safety device 10 is less than height 108. This is so that when kingpin 54 contacts safety device 10 inner edge portion 94 it is bracketed by lower section 104 and upper section 106 such that trailer 43 is inhibited from upward or lower motion relative to safety device 10. This is particularly important at catch 16, which is thinner than height 108 even if funneling portions 19, 23 are formed of thicker material. In the case where hitch plate 110 rests on safety device 10, if an upward force lifts trailer 43, lower section 104 will catch on inner edge 94 as the trailer moves rearwardly, thereby trailer 43 is restricted from coming out of contact with safety device 10. In the preferred embodiment, thickness 100 of safety device 10 is less than thickness 108 of king pin 54. FIG. 9 shows the trailer 43 in its proper towing position being coupled to the fifth wheel hitch 28. FIG. 10 shows the safety device 10 working in the case where the kingpin 54 is dislodged from the hitch 28. The length of the offsetting portions 17, 21 are chosen to place the catch 16 in a position that allows room for the kingpin 54 to fall into the safety device 10. This means that the offsetting portions 17, 21 are long enough so the catch 16 is behind the kingpin 54 when the trailer 43 falls off of the hitch 28 as shown in FIG. 10. If the offsetting portions 17, 21 are too short, the kingpin 54 could potentially slide over the catch 16 without being retained in the position shown in FIG. 10.

In an additional embodiment, safety device 11 is formed as three distinct pieces: a first mounting arm 64, a second mounting arm 66 and a wire 68, as shown in FIGS. 5-8. Mounting arms 64, 66 are bars having apertures 69 therethrough for securing mounting arms 64, 66 to rails 34, 35 respectively. Wire 68 is an elongated wire extending from a first end 70 to a second end 72. Wire 68 is preferably formed from a material which is both flexible and durable, such as braided steel. First end 70 of wire 68 is affixed by a first restraining apparatus 74, to first mounting arm 64. Likewise, second end 72 of wire 68 is affixed, such as by a second restraining apparatus 76, to second mounting arm 66. A middle portion 78 of wire 68 is defined by the portion of the wire spanning mounting arms 64, 66. Middle portion 78 of wire 68 is preferably U-shaped, and extends rearwardly of mounting arms 64, 66 to a catch 80, which is defined as the mid-point, or trough of the "U."

Figure 6:
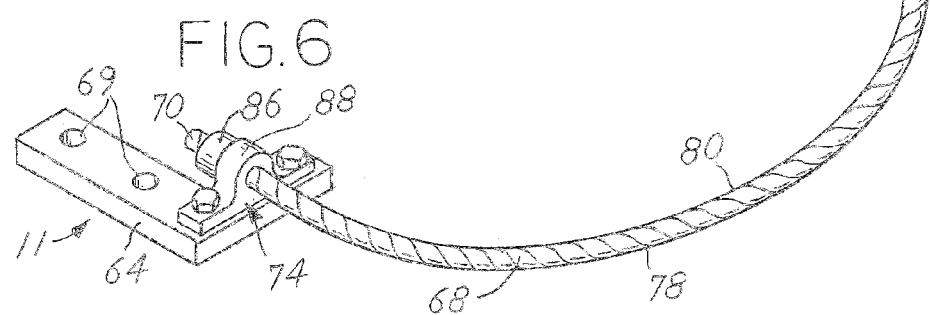
FIG. 6 is a close-up perspective view of the safety device of FIG. 5.
Figure 7:
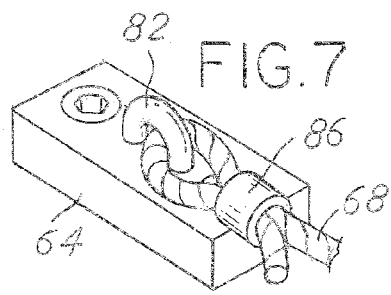
FIG. 7 is an alternative embodiment of the mounting arm of the safety device of FIG. 6.
Figure 8:
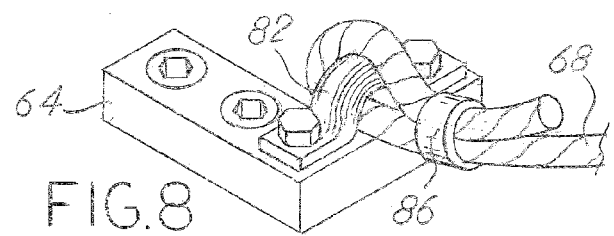
FIG. 8 is an additional embodiment of the mounting arm of the safety device of FIG. 6.

Restraining apparatuses 74, 76 may be formed in any of the various ways known in the art for securing wire 68 to mounting arms 64, 66, with representative examples shown in FIGS. 6-8. For example ring 82 affixed to mounting arm 64, 66, could receive a loop of cable 68 closed by a ferrule 86, the ends 70 and 72 being secured to mounting arms 64, 66 respectively. Similarly, a first clamp 88 and a second clamp 90 may be secured to mounting arms 64, 66 respectively, each retaining one end 70, 72 of wire 68. Restraining apparatuses 74, 76 may be oriented relative to mounting arms 64, 66 in any number of ways, such that ends 70, 72 pass through the apparatuses parallel with rails 34, 35, perpendicular to rails 34, 35, or any other suitable orientation.

What is claimed is:

1. A safety device for use on a towing vehicle that tows a trailer, said safety device comprising:
    a first mounting arm having a first leg and a second leg extending inwardly of said first leg of said first mounting arm;
    a second mounting arm having a first leg and a second leg extending inwardly of said first leg of said second mounting arm;
    a first funneling portion connected to said second leg of said first mounting arm;
    a second funneling portion connected to said second leg of said second mounting arm, said funneling portions being connected to form a continuous generally U-shaped device;
    said first mounting arm has a first offsetting portion extending from said first mounting arm and connected to said first funneling portion, said first offsetting portion including an inner edge located inwardly of said first mounting arm, said second mounting arm having a second offsetting portion extending from said second mounting arm and connected to said second funneling portion, said second offsetting portion including an inner edge located inwardly of said second mounting arm; and
    said first mounting arm, second mounting arm, said first offsetting portion, said second offsetting portion, said first funneling portion and said second funneling portion form a substantially planar structure, said safety device further comprising a nose portion being angled obliquely with respect to the rest of said safety device and extending out of plane with the rest of said safety device, said nose portion being located adjacent to a catch portion.

2. The safety device as claimed in claim 1, wherein said funneling portions join to form said catch portion that has an arcuate surface facing said mounting arms, said catch portion being substantially equidistantly located between said mounting arms.

3. The safety device as claimed in claim 2, wherein said first legs of said first and second mounting arms being substantially parallel, said first and second offset portions being substantially parallel.

4. A safety device for use with a towing vehicle and a trailer having a kingpin, said vehicle having a fifth wheel hitch mounted to a pair of substantially parallel frame rails on said vehicle, said fifth wheel hitch having a kingpin slot for receiving said kingpin and a locking jaw within said kingpin slot for retaining said kingpin of said trailer, said kingpin of said trailer having a narrowed section defined by a wider lower section and wider upper section said narrowed section having a smaller diameter than both said upper section and said lower section of said kingpin, said narrowed section having a height, said safety device comprising:
    a first mounting arm portion having a first leg and a second leg extending inwardly of said first leg of said first mounting arm portion, said first leg of said first mounting arm portion adapted for being fastened to one of said frame rails;
    a second mounting arm portion having a first leg and a second leg extending inwardly of said first leg of said second mounting arm portion, said first leg of said second mounting arm portion adapted for being fastened to another of said frame rails;
    a first funneling portion connected to said second leg of said first mounting arm portion;
    a second funneling portion connected to said second leg of said second mounting arm portion, said first and second funneling portions being connected to form a catch portion located where said first and second funneling portions meet; and
    said first and second mounting arm portions and said first and second funneling portions formed from a substantially planar structure of a substantially uniform thickness, said safety device further comprising a nose portion being angled obliquely with respect to the rest of said safety device and extending out of plane with the rest of said safety device, said nose portion being located adjacent to said catch portion.

5. The safety device of claim 4, wherein said first mounting arm portion has a first offsetting portion extending from said second leg of said first mounting arm portion and connected to said first funneling portion, said first offsetting portion including an inner edge located inwardly of said first mounting arm portion and being adapted to be inwardly located of a corresponding frame rail when said safety device is mounted to said frame rails, said second mounting arm portion having a second offsetting portion extending from said second leg of second mounting arm portion and connected to said second funneling portion, said second offsetting portion including an inner edge located inwardly of said second mounting arm portion and being adapted to be inwardly located of a corresponding frame rail when said safety device is mounted to said frame rails, said funneling portions forming obtuse angles with respect to said inner edges of said offsetting portions.

6. The safety device of claim 5, wherein said first legs of said first and second mounting arm portions being substantially parallel.

7. The safety device of claim 5, said first and second offsetting portions being substantially parallel.

* * * * *